United States Patent
Alkalay et al.

(10) Patent No.: US 12,086,417 B2
(45) Date of Patent: Sep. 10, 2024

(54) TECHNIQUES FOR SERVICING I/O OPERATIONS USING REDIRECTION

(71) Applicant: Dell Products L.P., Hopkinton, MA (US)

(72) Inventors: Amitai Alkalay, Kadima (IL); Vladimir Shveidel, Pardes-Hana (IL); Lior Kamran, Rishon LeZion (IL)

(73) Assignee: Dell Products L.P., Hopkinton, MA (US)

( * ) Notice: Subject to any disclaimer, the term of this patent is extended or adjusted under 35 U.S.C. 154(b) by 51 days.

(21) Appl. No.: 18/101,281

(22) Filed: Jan. 25, 2023

(65) Prior Publication Data

US 2024/0248606 A1    Jul. 25, 2024

(51) Int. Cl.
G06F 3/06 (2006.01)

(52) U.S. Cl.
CPC .......... G06F 3/0613 (2013.01); G06F 3/0647 (2013.01); G06F 3/067 (2013.01)

(58) Field of Classification Search
CPC ....... G06F 3/0613; G06F 3/0647; G06F 3/067
See application file for complete search history.

(56) References Cited

U.S. PATENT DOCUMENTS

| | | | | |
|---|---|---|---|---|
| 8,683,260 | B1* | 3/2014 | Zhang | G06F 11/1092 714/13 |
| 8,819,307 | B1* | 8/2014 | Raizen | G06F 3/0635 709/239 |
| 8,850,144 | B1* | 9/2014 | Natanzon | G06F 11/2064 711/162 |
| 10,009,215 | B1* | 6/2018 | Shorey | H04L 67/1001 |
| 10,089,037 | B1* | 10/2018 | Bono | G06F 3/0634 |
| 11,513,684 | B1* | 11/2022 | Tylik | G06F 3/0644 |
| 2014/0223096 | A1* | 8/2014 | Zhe Yang | G06F 3/0619 711/114 |
| 2019/0294347 | A1* | 9/2019 | McBride | G06F 3/0644 |
| 2019/0334801 | A1* | 10/2019 | Dutta | H04L 43/16 |

* cited by examiner

Primary Examiner — Ryan Bertram
(74) Attorney, Agent, or Firm — Muirhead and Saturnelli, LLC

(57) ABSTRACT

Techniques can include: configuring a federation to have a volume as active from only a first storage system so that hosts only sends I/O operations, directed to the first volume, to the first storage system; configuring a second storage system of the federation as inactive with respect to volume; determining, in accordance with criteria, to allow I/O operations directed to the volume to be sent to both the first and second storage systems; transitioning the second storage system, with respect to the volume, from inactive to active; and receiving, from a host at the first and second storage systems, I/O operations directed to the volume while the first and second storage systems are configured as active. The I/O operations can include a first I/O operation received at the second storage system which is redirected, by the second storage system, to the first storage system for servicing.

20 Claims, 8 Drawing Sheets

TECHNIQUES FOR SERVICING I/O OPERATIONS USING REDIRECTION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium. The system can include one or more processors and a memory including code stored therein that, when executed, performs the method. The non-transitory computer readable medium can include code stored thereon that, when, executed, performs the method. The method can comprise: configuring a federation to have a first volume as active from only a first storage system of the federation, wherein while the first volume is configured as active from only the first storage system of the federation, a host only sends I/O operations, which are directed to the first volume, to the first storage system of the federation, wherein said configuring the federation includes: configuring as inactive, with respect to the first volume, a second storage system of the federation; determining, subsequent to said configuring and in accordance with criteria, to allow I/O operations directed to the first volume to be sent to both the first storage system and the second storage system of the federation; responsive to said determining, transitioning the second storage system, with respect to the first volume, from inactive to active, wherein the first storage system is configured as active while the second storage system is also configured as active; and receiving, from the host at the first storage system and the second storage system, a plurality of I/O operations directed to the first volume while the first storage system and the second storage system are configured as active, wherein the plurality of I/O operations includes a first I/O operation received at the second storage system which is redirected, by the second storage system, to the first storage system for servicing.

In at least one embodiment, configuring the federation can further include configuring as active, with respect to the first volume, the first storage system of the federation, wherein the host sends I/O operations directed to the first volume over a first set of one or more paths between the host and the first storage system while the first storage system is configured as active. The host may not send I/O operations directed to the first volume over a second set of one or more paths between the host and the second storage system while the second storage system is configured as inactive. The first volume can be owned by the first storage system and physical storage mapped to the first volume can be included on one or more non-volatile storage devices of the first storage system. While the first storage system is owner of the first volume, the first storage system can service all I/O operations which are received by the federation and directed to the first volume.

In at least one embodiment, the criteria can include a plurality of conditions which all evaluate to true in the determining step and indicate to allow I/O operations directed to the first volume to be sent to both the first storage system and the second storage system of the federation. The criteria can include a first condition which evaluates to true when front-end connectivity of front-end ports of the first storage system is saturated. The first condition can evaluate whether a current front-end connectivity utilization of front-end ports of the first storage system is above a specified threshold. The specified threshold can denote an aggregate maximum bandwidth of front-end ports of the first storage system. The criteria can include a second condition which evaluates to true when the second storage system has a sufficient level of available resources. The second condition can evaluate whether the front-end connectivity utilization of front-end ports of the second storage system is below a specified threshold and whether CPU utilization of the second storage system is below a specified threshold.

In at least one embodiment, processing can include: monitoring resource usage of storage systems of the federation; subsequent to said transitioning the second storage system, with respect to the first volume, from inactive to active, determining in accordance with said monitoring and the criteria to not allow I/O operations directed to the first volume to be sent to the second storage system of the federation; responsive to said determining to not allow I/O operations directed to the first volume to be sent to the second storage system of the federation, transitioning the second storage system, with respect to the first volume, from active to inactive; receiving, from the host at the second storage system while the second storage system is configured as inactive with respect to the first volume, a second I/O operations directed to the first volume; and responsive to receiving the second I/O operation while the second storage system is configured as inactive with respect to the first volume, not servicing the second I/O operation and returning a corresponding error state to the host. Determining in accordance with the criteria to not allow I/O operations directed to the first volume to be sent to the second storage system of the federation can include determining that at least one of the plurality of conditions of the criteria does not evaluate to true.

In at least one embodiment, receiving the plurality of I/O operations directed to the first volume while the first storage system and the second storage system are configured as active can further include: receiving, at the second storage system from the host, the first I/O operation directed to the first volume; redirecting, by an I/O redirector of the second storage system, the first I/O operation from the second storage system to the first storage system; servicing, by the first storage system, the first I/O operation directed to the first volume; and returning a first response to the host for the first I/O operation, wherein the first response is returned along a return path from the first storage system to the second storage system, and then from the second storage system to the host. Receiving the plurality of I/O operations directed to the first volume while the first storage system and the second storage system are configured as active can further include: receiving, at the first storage system, a second I/O operation directed to the first volume; servicing, by the first storage system, the second I/O operation directed to the first volume; and returning a second response to the host for the second I/O operation, wherein the second response is returned along a second return path from the first storage system to the host without including the second storage system.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
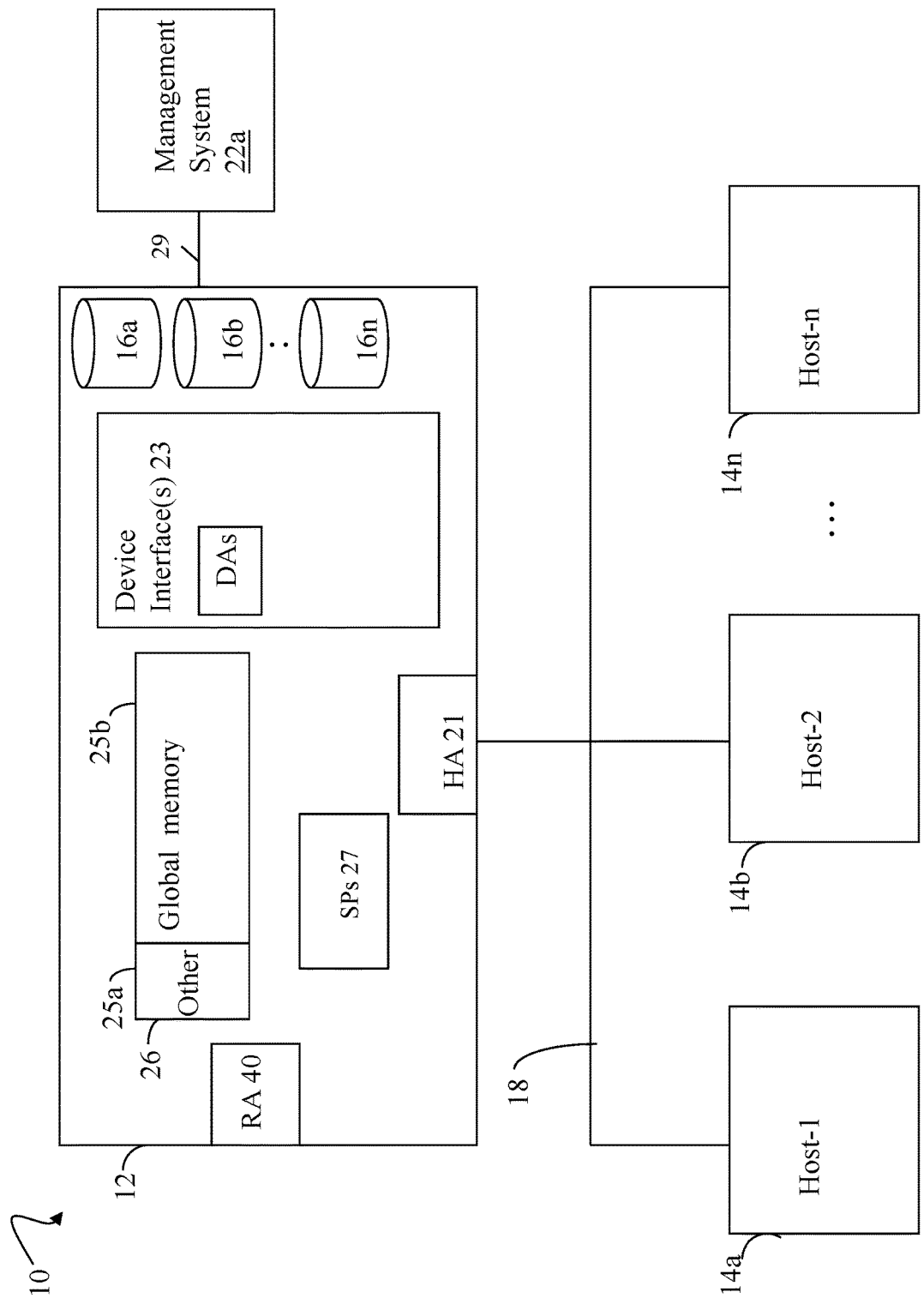
FIG. 1 is an example of components included in a system in accordance with the techniques of the present disclosure.

A federation can include multiple data storage systems or storage appliances. Each such storage system or appliance can service I/Os in connection with various logical volumes (also sometimes referred to herein as simply volumes) of storage configured in the federation. In some existing systems, a concept of volume ownership is applied and can denote the level of storage ownership granularity by a system or appliance. Each volume can be assigned to, or owned by, a single one of the systems or appliances of the federation. The single system or appliance designated as the owner of a volume can service all I/Os directed to the volume. A volume owned by a system or appliance can be configured from physical storage located on non-volatile storage devices providing back-end (BE) long term storage for the volume, where such non-volatile BE storage devices can be accessible locally by the owning system or appliance.

Ownership of volumes configured in the federation can be partitioned or distributed among the various storage systems or appliances of the cluster. Such distribution or partitioning of volume ownership can be performed with various goals or targets such as to balance the load between the storage systems or appliances of the cluster. Some systems can provide for workload rebalancing including redistributing or reassigning volume ownership among the storage systems or appliances as the workload of the various volumes can change over time. However, due to the granularity of ownership being per volume, load balancing can be a complex task. In some cases, reassignment of volume ownership from a first system or appliance to a second system or appliance can include migrating the volume from the first to the second system or appliance which can further impact performance. Additionally, volumes can have different workload patterns that vary throughout the day which can create variations in workload imbalance among the systems or appliances throughout the day. Some configurations have a small number of volumes or a few dominating volumes with very high workload which can further increase the difficulty in load balancing.

The foregoing complexities and variations in workload can make it difficult to achieve a constant and desired level of workload balance among the system or appliances of the federation. The workload imbalances can lead to system inefficiencies which limit performance while, at the same time, there can also be underutilized resources. The foregoing workload imbalance and adverse effects can be even more critical when a resource becomes a bottleneck on a particular appliance or system. For example, consider a scenario in a federation with appliances or systems A and B, where a first volume V1 is owned by, or assigned to, system A. System A can service large read I/Os directed to V1 which result in saturation of system A's FE (front-end) connectivity, and in particular, saturation of the FE ports of the system A. In at least one existing system, since system A is the owner of V1 designated as the sole system which services I/Os directed to V1, system B cannot be leveraged to service the read I/Os directed to V1. As a result, system A's FE connectivity can become a bottleneck limiting performance, such as I/O performance of V1 and other volumes. While system A has the FE connectivity bottleneck, system A can also have underutilized other resources, such as underutilized available CPU and/or memory, currently available to service other I/O requests. Additionally, system B can have underutilized FE connectivity in that its FE ports may have plenty of available unconsumed bandwidth.

To overcome the foregoing and other drawbacks, described in the following paragraphs are techniques providing more efficient resource utilization. The techniques of the present disclosure provide for utilizing the FE connectivity resources of the FE ports of one or more appliances, such as system B noted above, when FE connectivity of FE ports of another system, such as system A noted above, are saturated.

In at least one embodiment with respect to the volume V1 at a first point in time, the owning system A can be initially configured as active and the non-owning system B can be initially configured as inactive. As a result of the foregoing, V1 can be exposed over active paths from FE ports of the system A to hosts or other storage clients which issue requests directed to V1; and V1 may not be exposed over inactive paths from FE ports of the system B to hosts or other storage clients. I/Os directed to V1 which are sent over an inactive path to an FE port of system B are not serviced and can result in an error or other suitable resulting state or condition.

In at least one embodiment in accordance with the techniques of the present disclosure continuing with the example noted above, in response to determining that specified conditions of defined criteria are met, processing can be performed to transition system B from the inactive state to an active state with respect to V1 so that requests directed to the volume V1 can be received by both systems A and B even though system A owns V1. In this manner, requests, such as I/O operations, directed to V1 which are received at system B can consume underutilized available FE connectivity resources of system B. Such requests directed to V1 which are received at system B can then be redirected from system B to the owning system A over an inter-system link or connection between the systems A and B. In at least one embodiment, the inter-system link or connection between systems A and B can be used exclusively for inter-system communications between systems of the federation. Thus, generally requests directed to a volume can be additionally received at one or more non-owning systems, where the non-owning system can then redirect or forward the requests to the owning system over the inter-system link or connection therebetween.

In at least one embodiment, the criteria can be defined which specifies the conditions which must be true or met in order to utilize the redirection route, such as for volume V1 requests which are received at system B and redirected to owning system A over the inter-system connection or link. In at least one embodiment, the criteria can include two conditions that must be met or true in order to utilize the redirection route. With respect to the above example, the first condition of the criteria is that the first system, the owning system A (which owns V1), has FE connectivity with FE ports which are saturated; and the second condition of the criteria is that the other system, non-owning system B, has a sufficient level of available or unused resources. In at least one embodiment, the first condition can be met when the owning system A has a measured level of FE connectivity utilization above a first predefined threshold; and the second condition can be met when the non-owning system B has a measured level of FE connectivity utilization which is below a second predefined threshold, and additionally system B has a measured level of CPU utilization which is below a third predefined threshold. The foregoing first, second and third thresholds can be any suitable values. In at least one embodiment, each of the various resource utilization levels used in the criteria, such as the FE connectivity utilization of system A, the FE connectivity utilization of system B, and the CPU utilization of system B, can denote an aggregate utilization level of a particular resource on the corresponding system.

When the foregoing two conditions of the criteria are met or evaluate to true, the non-owning system B can be used to redirect requests, which are directed to volume V1 and received at system B, to the owning system A. In such an embodiment, the federation can be initially configured at the first point in time such that volume V1 is presented as active over paths from one system or appliance (e.g., such as owning system A) and presented as inactive over paths from another system or appliance (e.g., such as non-owning system B). At a second point in time subsequent to the first point in time, the two conditions of the criteria can be met where both conditions evaluate to true. Responsive to the two conditions of the criteria evaluating to true, processing can be performed to allow requests directed to V1 to be sent to both systems A and B. In order to allow requests directed to V1 to be sent to both systems A and B, the state of the systems A and B (and thus the paths to both systems A and B) are presented to the host as active with respect to the volume V1. Generally when both conditions evaluate to true, processing can be performed to transition system B from an inactive state to an active state with respect to servicing requests directed to V1. As a result of such processing, both systems A and B can be designated or configured as active with respect to receiving requests directed to the volume V1. In this manner with respect to V1, the paths to the non-owning system B can transition from inactive to active while the paths to the owning system A remain active. An I/O redirector component of system B can handle redirecting any requests, which are received at system B and directed to volume V1 to the system A, over the inter-system link or connection, where system A can service the requests of V1.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
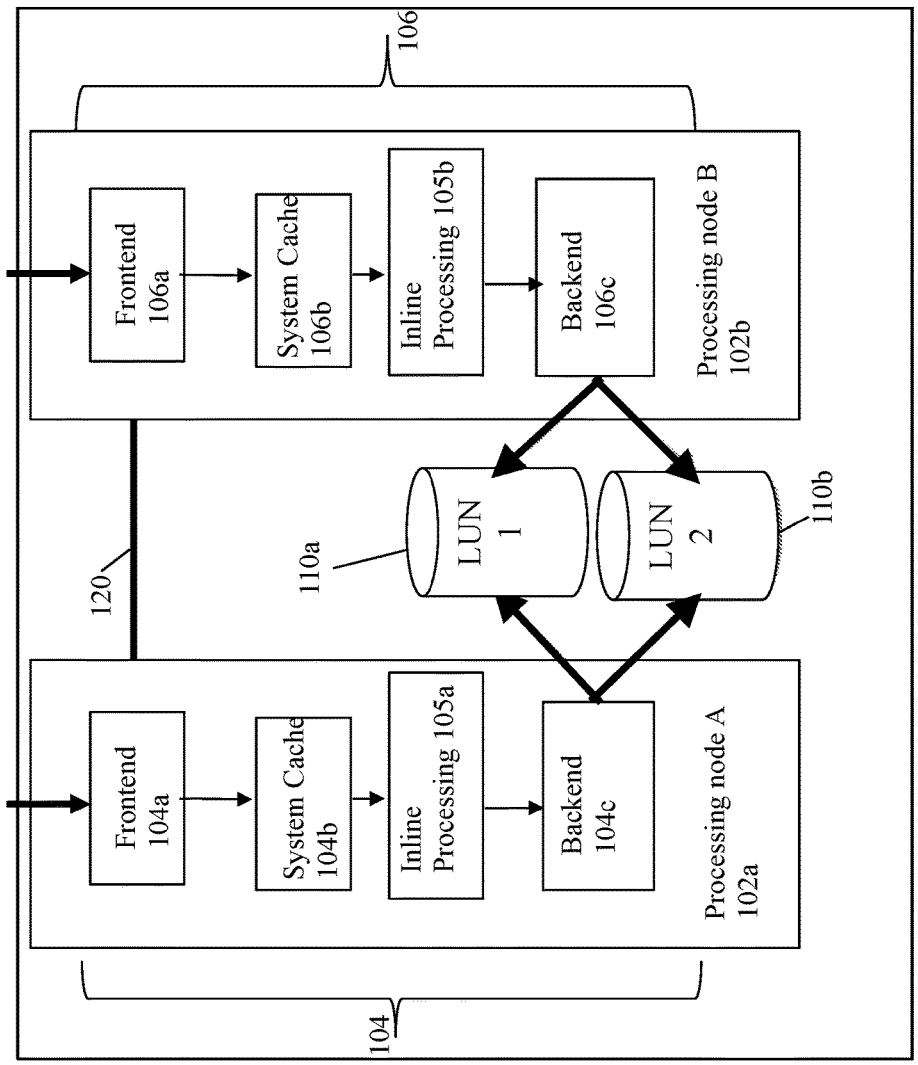
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 100, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and BE component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache (e.g., cache hit or read cache hit), the read data block is retrieved from the system cache 104b and returned to the host. Otherwise, if the requested read data block is not in the system cache 104b (e.g., cache miss or read cache miss) but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

A federation can include multiple data storage systems or storage appliances. Each such storage system or appliance can service I/Os in connection with various logical volumes (also sometimes referred to herein as simply volumes) of storage configured in the federation. In some existing systems, a concept of volume ownership is applied and can denote the level of storage ownership granularity by a system or appliance. Each volume can be assigned to, or owned by, a single one of the systems or appliances of the federation. The single system or appliance designated as the owner of a volume can service all I/Os directed to the volume. A volume owned by a system or appliance can be configured from physical storage located on non-volatile storage devices providing back-end (BE) long term storage for the volume, where such non-volatile BE storage devices can be accessible locally by the owning system or appliance.

Ownership of volumes configured in the federation can be partitioned or distributed among the various storage systems or appliances of the cluster. Such distribution or partitioning of volume ownership can be performed with various goals or targets such as to balance the load between the storage systems or appliances of the cluster. Some systems can provide for workload rebalancing including redistributing or reassigning volume ownership among the storage systems or appliances as the workload of the various volumes can change over time. However, due to the granularity of ownership being per volume, load balancing can be a complex task. In some cases, reassignment of volume ownership from a first system or appliance to a second system or appliance can include migrating the volume from the first to the second system or appliance which can further impact performance. Additionally, volumes can have different workload patterns that vary throughout the day which can create variations in workload imbalance among the systems or appliances throughout the day. Some configurations have a small number of volumes or a few dominating volumes with very high workload which can further increase the difficulty in load balancing.

The foregoing complexities and variations in workload can make it difficult to achieve a constant and desired level of workload balance among the system or appliances of the federation. The workload imbalances can lead to system inefficiencies which limit performance while, at the same time, there can also be underutilized resources. The foregoing workload imbalance and adverse effects can be even more critical when a resource becomes a bottleneck on a particular appliance or system. For example, consider a scenario in a federation with appliances or systems A and B, where a first volume V1 is owned by, or assigned to, system A. System A can service large read I/Os directed to V1 which result in saturation of system A's FE connectivity, and in particular, saturation of the FE ports of the system A. In at least one existing system, since system A is the owner of V1 designated as the sole system which services I/Os directed to V1, system B cannot be leveraged to service the read I/Os directed to V1. As a result, system A's FE connectivity can become a bottleneck limiting performance, such as I/O performance of V1 and other volumes. While system A has the FE connectivity bottleneck, system A can also have underutilized other resources, such as underutilized available CPU and/or memory, currently available to service other I/O requests. Additionally, system B can have underutilized FE connectivity in that its FE ports may have plenty of available unconsumed bandwidth.

To overcome the foregoing and other drawbacks, described in the following paragraphs are techniques providing more efficient resource utilization. The techniques of the present disclosure provide for utilizing the FE connectivity resources of the FE ports of one or more appliances, such as system B noted above, when FE connectivity of FE ports of another system, such as system A noted above, are saturated.

In at least one embodiment with respect to the volume V1 at a first point in time, the owning system A can be initially configured as active and the non-owning system B can be initially configured as inactive. As a result of the foregoing, V1 can be exposed over active paths from FE ports of the system A to hosts or other storage clients which issue requests directed to V1; and V1 may not be exposed over inactive paths from FE ports of the system B to hosts or other storage clients. I/Os directed to V1 which are sent over an inactive path to an FE port of system B are not serviced and can result in an error or other suitable resulting state or condition.

In at least one embodiment in accordance with the techniques of the present disclosure continuing with the example noted above, in response to determining that specified conditions of defined criteria are met, processing can be performed to transition system B from the inactive state to an active state with respect to V1 so that requests directed to the volume V1 can be received by both systems A and B even though system A owns V1. In this manner, requests, such as I/O operations, directed to V1 which are received at system B can consume underutilized available FE connectivity resources of system B. Such requests directed to V1 which are received at system B can then be redirected from system B to the owning system A over an inter-system link or connection between the systems A and B. In at least one embodiment, the inter-system link or connection between systems A and B can be used exclusively for inter-system communications between systems of the federation. Thus, generally requests directed to a volume can be additionally received at one or more non-owning systems, where the non-owning system can then redirect or forward the requests to the owning system over the inter-system link or connection therebetween.

In at least one embodiment, the criteria can be defined which specifies the conditions which must be true or met in order to utilize the redirection route, such as for volume V1 requests which are received at system B and redirected to owning system A over the inter-system connection or link. In at least one embodiment, the criteria can include two conditions that must be met or true in order to utilize the redirection route. With respect to the above example, the first condition of the criteria is that the first system, the owning system A (which owns V1), has FE connectivity with FE ports which are saturated; and the second condition of the criteria is that the other system, non-owning system B, has a sufficient level of available or unused resources. In at least one embodiment, the first condition can be met when the owning system A has a measured level of FE connectivity utilization above a first predefined threshold; and the second condition can be met when the non-owning system B has a measured level of FE connectivity utilization which is below a second predefined threshold, and additionally system B has a measured level of CPU utilization which is below a third predefined threshold. The foregoing first, second and third thresholds can be any suitable values. In at least one embodiment, each of the various resource utilization levels used in the criteria, such as the FE connectivity utilization of system A, the FE connectivity utilization of system B, and the CPU utilization of system B, can denote an aggregate utilization level of a particular resource on the corresponding system.

When the foregoing two conditions of the criteria are met or evaluate to true, the non-owning system B can be used to redirect requests, which are directed to volume V1 and received at system B, to the owning system A. In such an embodiment, the federation can be initially configured at the first point in time such that volume V1 is presented as active over paths from one system or appliance (e.g., such as owning system A) and presented as inactive over paths from another system or appliance (e.g., such as non-owning system B). At a second point in time subsequent to the first point in time, the two conditions of the criteria can be met where both conditions evaluate to true. Responsive to the two conditions of the criteria evaluating to true, processing can be performed to allow requests directed to V1 to be sent to both systems A and B. In order to allow requests directed to V1 to be sent to both systems A and B, the state of the systems A and B (and thus the paths to both systems A and B) are presented to the host as active with respect to the volume V1. Generally when both conditions evaluate to true, processing can be performed to transition system B from an inactive state to an active state with respect to servicing requests directed to V1. As a result of such processing, both systems A and B can be designated or configured as active with respect to receiving requests directed to the volume V1. In this manner with respect to V1, the paths to the non-owning system B can transition from inactive to active while the paths to the owning system A remain active. An I/O redirector component of system B can handle redirecting any requests, which are received at system B and directed to volume V1 to the system A, over the inter-system link or connection, where system A can service the requests of V1.

The foregoing and other aspects of the techniques of the present disclosure are described in more detail in the following paragraphs.

In at least one embodiment, active and inactive can denote alternative states of a data storage system and corresponding paths from FE ports of the data storage system with respect to a LUN or volume. A data storage system can be configured to have a state of active with respect to a LUN or volume denoting that the system presents the LUN or volume as active from the data storage system. A data storage system configured as active with respect to a LUN or volume indicates that the active system can receive for servicing I/Os directed to the LUN or volume where such I/Os can be sent by a host to the FE ports of the active system. Put another way, the LUN or volume is exposed and accessible to the host over FE ports of the active system. In contrast, a data storage system can be configured to have a state of inactive with respect to a LUN or volume denoting that the system presents the LUN or volume as inactive from the data storage system. A data storage system configured as inactive with respect to a LUN or volume indicates that the inactive system does not receive for servicing I/Os directed to the LUN or volume. Put another way, the LUN or volume is inaccessible to the host for I/Os over FE ports of the inactive system.

In at least one embodiment, a system configured as active for a LUN or volume can indicate that paths through FE ports of the active system are also active paths with respect to the LUN or volume. In at least one embodiment, a system configured as inactive for a LUN or volume can indicate that paths through FE ports of the inactive system are also inactive paths with respect to the LUN or volume. In this manner, the state of active or inactive of a data storage system with respect to a LUN or volume can further denote the state of FE ports and paths to the data storage system with respect to the LUN or volume.

An active path with respect to a LUN can indicate that the LUN is exposed, available and accessible to the host over the path or link between the host and data storage system, where the active path can be used by the host for sending I/Os to the data storage system for servicing. In particular, for a path between a data storage system front end (FE) port and a host port, the path can be designated as active with respect to a LUN, where the LUN is exposed, available and accessible to the host port of the path over the FE port of the path, and where the host can issue I/Os, which are directed to the LUN, over the path from the host port to the FE port of the data storage system.

In contrast to an active path is an inactive path. An inactive path with respect to a LUN indicates that the LUN is not exposed, not available, and/or not accessible to the host over the path or link between the host and data storage system and where the inactive path cannot be used by the host for sending I/Os to the data storage system. In particular, for a path between a data storage system FE port and a host port, the path can be designated as inactive with respect to a LUN where the LUN is not exposed, is unavailable and is inaccessible, for I/Os directed to the LUN, over the path between the host port and the FE port. Thus, I/Os issued by the host, which are directed to the LUN, over the inactive path from the host port to the FE port of the data storage system are not serviced and can result in an I/O error or other suitable state.

A particular path, link or connection between a host port and a FE port of a data storage system can have a status of active with respect to a first LUN while simultaneously having a status of inactive with respect to a second different LUN. In this case, the first LUN can be exposed, visible and available for I/O to a host over the path while the second LUN is not exposed, visible and available for I/O to the host over the same path.

In at least one embodiment, the data storage system can assign a particular status of active or inactive to a path with respect a particular LUN. The path status can be communicated from the data storage system to the host in any suitable manner. For example, in at least one embodiment, such information regarding status of paths with respect to various LUNs can be communicated by the storage system to hosts as part of discovery processing in response to various commands from the hosts.

The states of data storage systems and various paths with respect to LUNs can also be reconfigured to change dynamically over time. A change in system and/or path status can be communicated from the data storage system to the host in any suitable manner in accordance with the particular standard supported or utilized in an embodiment. For example, in at least one embodiment, a change in path and/or data storage system status with respect to a LUN or volume can be communicated from the data storage system to the host using various commands and/or responses. Also a change in system and/or path status with respect to a first data storage system can be communicated from the first data storage system to other systems of the federation in any suitable manner in an embodiment.

For a first path or system which is active and transitions to inactive with respect to a LUN, a host can discover the change in status when the host attempts to send a first I/O on the first path to the system when inactive. In response to the first I/O, the host can receive a response indicating the first I/O failure and/or change in path and/or system status from active to inactive. Alternatively, the host can learn about the change in path and/or system status subsequent to the first I/O failure by sending a SCSI inquiry, SCSI report target port groups, or other suitable command to the data storage system over the first path, where the data storage system sends a corresponding command response including the change in path and/or system status. For a second path or system which is inactive and transitions to active with respect to a LUN, the host can be notified regarding the change in path and/or system status in any suitable manner. In response to the notification, the host can then issue a command (e.g., SCSI inquiry, report target port groups, or other suitable command) over the second path to the system to obtain current path and/or system status information for the LUN and possibly other LUNs.

Although the techniques of the present disclosure are described herein with respect to two data storage systems of the federation, the techniques of the present disclosure can also be extended and used in connection with more than two data storage systems or appliances of a federation. In at least one embodiment, the techniques of the present disclosure can be extended, for example, where the redirection techniques as described herein with respect to a LUN or volume are performed across multiple non-owning systems or appliances and a single owning system or appliance (which owns the LUN or volume).

Figure 3:
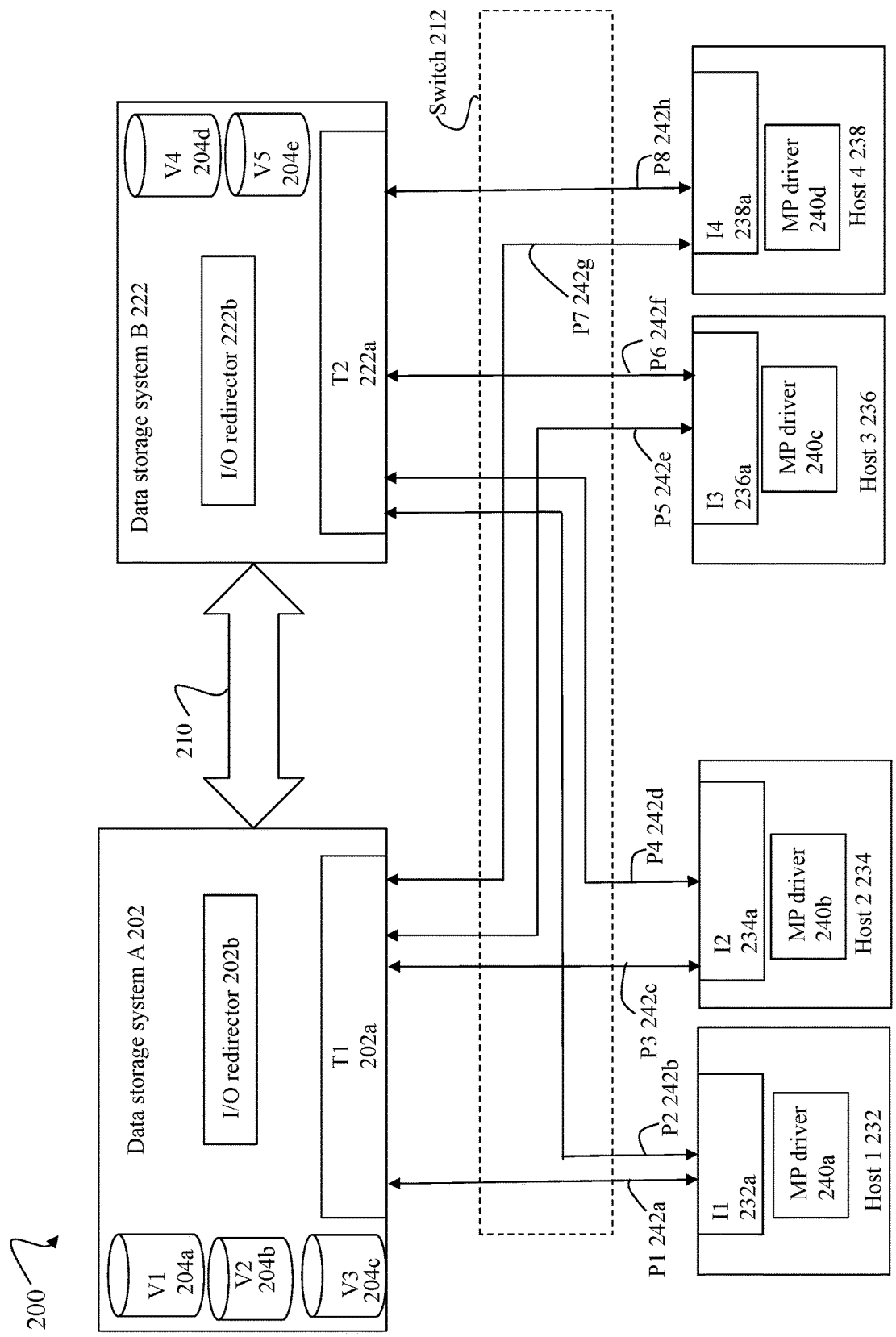
FIG. 3 is an example of systems and zoned and configured paths in at least one embodiment in accordance with the techniques of the present disclosure.

Referring to FIG. 3, shown is an example 200 illustrating systems in at least one embodiment in accordance with the techniques of the present disclosure.

The example 200 illustrates a federation of two appliances or systems, data storage systems 202 and 222. Element 210 denotes an inter-system link or connection used for communication between the systems 202 and 222. In at least one embodiment, the link or connection 210 can be network connection such as a 10 Gigabit per second (GBps) or 25 GBps ethernet connection. The example 200 includes 4 hosts 232, 234, 236 and 238 which are storage clients of the data storage systems 202 and 222. The hosts 232, 234, 236, and the data storage systems 202, 222, can communicate with each other over paths through a switch 212 which can be generally included in a network fabric. In at least one embodiment, the systems 202 and 222 can be appliances as described elsewhere herein (e.g., in connection with FIG. 2) and the hosts 232, 234, 236 and 238 can be as described elsewhere herein (e.g., in connection with FIG. 1).

The data storage system A 202 can include volumes or LUNs V1 204a, V2 204b and V3 204c each having non-volatile physical storage provisioned from BE PDs of the system 202. The system 202 can include T1 202a denoting one or more FE storage system ports of the system 202 over which the LUNs or volumes 204a-c can be exposed or visible to the hosts 232, 234, 236 and 238 for I/Os. The data storage system B 222 can include volumes or LUNs V4 204d and V5 204e each having non-volatile physical storage provisioned from BE PDs of the system 222. The system 222 can include T2 222a denoting one or more FE storage system ports of the system 222 over which the LUNs or volumes 204d-e can be exposed or visible to the hosts 232, 234, 236 and 238 for I/Os. The system 202 can include I/O redirector 202b and the system 222 can include I/O redirector 222b. In at least one embodiment, the I/O redirector 202b can be used in accordance with the techniques of the present disclosure to redirect I/Os received at the system 202 when such I/Os are directed to a LUN or volume not owned by the system 202 and where the I/O redirector 202b forwards such I/Os to the owning system, such as the system 222. In at least one embodiment, the I/O redirector 222b can be used in accordance with the techniques of the present disclosure to redirect I/Os received at the system 222 when such I/Os are directed to a LUN or volume not owned by the system 222 and where the I/O redirector 222b forwards such I/Os to the owning system, such as the system 202. The I/O redirectors 202b, 222b as used in connection with the techniques of the present disclosure are discussed in more detail elsewhere herein.

The host 232 can include MP (multipathing) driver 240a and I1 232a denoting one or more ports of the host 232. The host 234 can include MP driver 240b and I2 234a denoting one or more ports of the host 234. The host 236 can include MP driver 240c and I3 236a denoting one or more ports of the host 236. The host 238 can include MP driver 240d and I4 238a denoting one or more ports of the host 236. Each of the MP drivers 240a-d can include functionality to perform any one or more different types of processing such as related to multipathing. For example, each MP driver can include multipathing functionality for management and use of multiple paths, where the same volume or LUN is exposed to the host (including the MP driver) over such multiple paths. For example, the MP driver can perform path selection to select one of the possible multiple paths over which to send an I/O based on various MP policies such as load balancing to distribute I/O requests across active paths. Host side load balancing may be performed by the MP driver to provide for better resource utilization and increased performance of the host, data storage system, and network or other connection infrastructure. Consistent with other discussion herein, when a volume or LUN is exposed to a host (and thus the host's MP driver) over multiple paths (e.g., where the same LUN is accessible through multiple different FE ports of the data storage system), the data storage systems may vary the associated state of each such path in order to vary and control the particular ones of the multiple paths over which the host may issue I/Os to the LUN.

Generally, the FE ports 202a, 222a respectively of the systems 202, 222, and the host ports 232a, 234a, 236a and 238a, respectively of the hosts 232, 234, 236 and 238 are communication ports used for sending and receiving communications. A path may be defined between two ports such as between a host port of a host and an FE port of a storage system. A command may be sent from a host (as well as a component thereof such as a host bus adapter or HBA port) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over such a path, one or more LUNs or volumes may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as a data storage system target FE port, is the target receiving the commands from the initiator.

In the example 200, there are 8 zoned and configured paths: path P1 242a between I1 232a and T1 202a (represented also herein as I1-T1); path P2 242b between I1 232a and T2 222a (represented also herein as I1-T2); path P3 242c between I2 234a and T1 202a (represented also herein as I2-T1); path P4 242d between I2 234a and T2 222a (represented also herein as I2-T2); path P5 242e between I3 236a and T1 202a (represented also herein as I3-T1); path P6 242f between I3 236a and T2 222a (represented also herein as I3-T2); path P7 242g between I4 238a and T1 202a (represented also herein as I4-T1); and path P8 242h between I4 238a and T2 222a (represented also herein as I4-T2). Consistent with other discussion herein, each of the systems 202, 222 and paths from FE ports of such systems, can be in an active state or an inactive state. At various points in time, the systems 202, 222 and paths from FE ports of such systems can transition between the active and inactive state in accordance with the techniques of the present disclosure discussed in more detail elsewhere herein.

In the example 200 at a first point in time, system A 202 can be configured as active with respect to volumes or LUNs 204a-c such that volumes or LUNs 204a-c are exposed to the hosts 232, 234, 236 and 238 over the one or more FE ports 202a. In this manner, the volumes or LUNs 204a-c are visible or exposed to the hosts 232, 234, 236 and 238 for I/Os over the active paths P1 242a, P3 242c, P5 242e and P7 242g. In the example 200 at the first point in time, system B 222 can be configured as inactive with respect to volumes or LUNs 204a-c such that volumes or LUNs 204a-c are not visible or not exposed to the hosts 232, 234, 236 and 238 over the one or more FE ports 222a. In this manner, the volumes or LUNs 204a-c are not visible or not exposed to the hosts 232, 234, 236 and 238 for I/Os over the inactive paths P2 242b, P4 242d, P6 242f and P8 242h.

In the example 200 at the first point in time, system B 222 can be configured as active with respect to volumes or LUNs 204d-e such that volumes or LUNs 204d-e are exposed to the hosts 232, 234, 236 and 238 over the one or more FE ports 222a. In this manner, the volumes or LUNs 204d-e are visible or exposed to the hosts 232, 234, 236 and 238 for I/Os over the active paths P2 242b, P4 242d, P6 242f and P8 242h. In the example 200 at the first point in time, system A 202 can be configured as inactive with respect to volumes or LUNs 204d-e such that volumes or LUNs 204d-e are not visible or not exposed to the hosts 232, 234, 236 and 238 over the one or more FE ports 202a. In this manner, the volumes or LUNs 204d-e are not visible or not exposed to the hosts 232, 234, 236 and 238 for I/Os over the inactive paths P1 242a, P3 242c, P5 242e and P7 242g.

Figure 4:
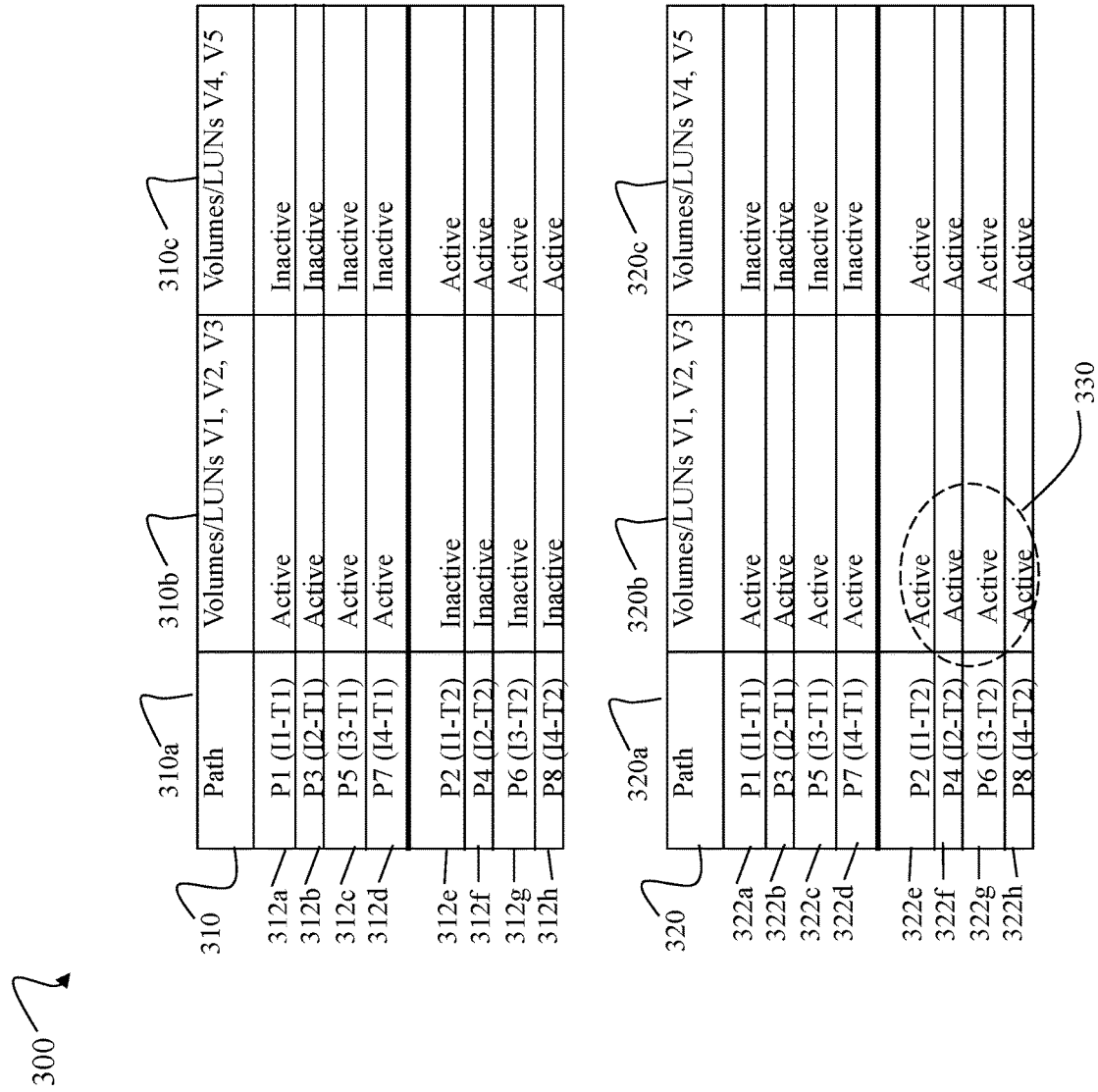
FIG. 4 is an example of tables of path states in at least one embodiment in accordance with the techniques of the present disclosure.

Referring to FIG. 4, shown are tables 310 and 320 summarizing path and system state information at two points in time in at least one embodiment in accordance with the techniques of the present disclosure.

The table 310 summarizes the states of active and inactive of the various 8 paths P1-P8 with respect to the volumes or LUNs 204a-e at the first point in time discussed above. As noted above at the first point in time, volumes or LUNs V1, V2 and V3 can be configured and presented as active on system A and inactive on system B; and volumes or LUNs V4, V5, and V6 can be configured and presented as active on system B and inactive on system A. The table 310 denotes the path states at the first point in time consistent with the foregoing system states. The table 310 includes the following columns of information: path 310a, volumes or LUNs V1, V2 and V3 310b, and volumes or LUNs V4 and V5 310c. Each row denotes the state of a particular path (310a) with respect to the volumes or LUNs V1, V2 and V3 (310b) and also with respect to the volumes or LUNs V4 and V5 (310c). The rows 312a-d indicate, respectively, that the paths P1, P3, P5 and P7 are active with respect to the volumes V1, V2 and V3 and inactive with respect to the volumes V4 and V5. The rows 312e-h indicate, respectively, that the paths P2, P4, P6 and P8 are inactive with respect to the volumes V1, V2 and V3 and active with respect to the volumes V4 and V5.

Figure 5:
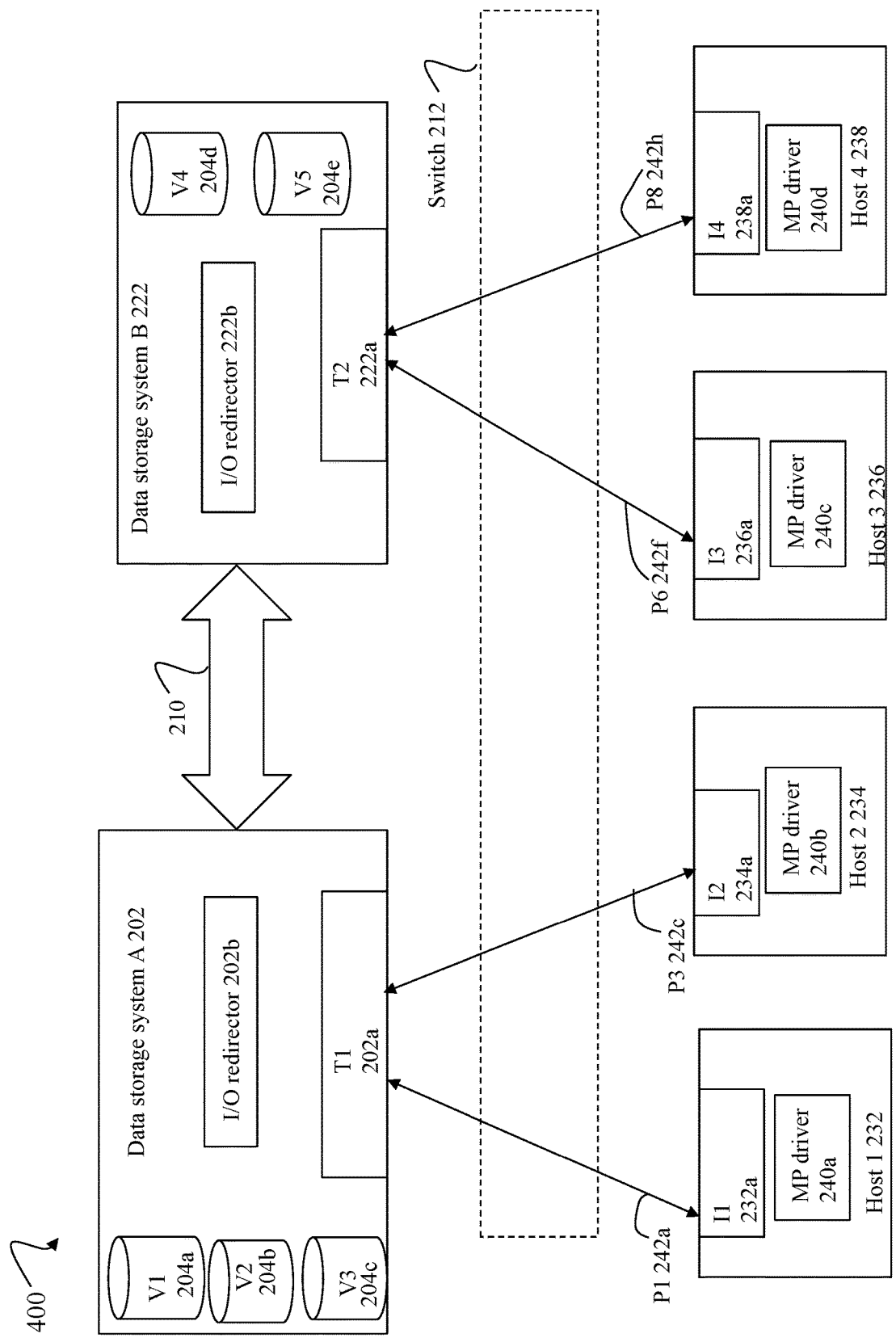
FIGS. 5 and 6 are examples illustrating I/O flow over some of the configured paths of FIG. 3 in at least one embodiment in accordance with the techniques of the present disclosure.

Also at the first point in time as illustrated in FIG. 5, of those paths configured as active with respect to corresponding LUNs or volumes as denoted in the table 310, assume that 4 paths are currently being used for sending I/Os to the systems 202 and 222. In particular with reference to FIG. 5, at the first point in time: the host 1 232 is sending I/Os, which are directed to volume V1 204a, over the path P1 (I1-T1) 242a to the system A 202; the host 2 234 is sending I/Os, which are directed to volume V1 204a, over the path P3 (I2-T1) 242c to the system 202; the host 3 236 is sending I/Os, which are directed to volumes V4 204d and V5 204e, over the path P6 (I3-T2) 242f; and the host 4 238 is sending I/Os, which are directed to volumes V4 204d and V5 204e, over the path P8 (I4-T2) 242h. Thus the example 400 of FIG. 5 illustrates 4 active paths over which I/Os are being sent at the first point in time.

At the first point in time, criteria including a first condition and a second condition can be evaluated to determine whether the FE connectivity of system A 202 is saturated or overloaded and also whether system B 222 has sufficient available or free resources for use in alleviating the overloaded FE connectivity condition of system A 202. In at least one embodiment, the first and second conditions of the criteria being met and evaluating to true can trigger performing processing to utilize a redirection route and the additional resources of system B 222 to alleviate the overloaded FE connectivity condition of system A 202.

As a result of the I/Os directed to V1 sent by the hosts 232 and 234 at the first point in time over the paths P1 242a and P3 242c, the FE connectivity of the FE ports T1 202a of the system A 202 can be determined to be saturated or overloaded in accordance with defined criteria. In at least one embodiment, the first condition of the criteria can be used to evaluate whether current FE connectivity utilization of the system A 202 is saturated or overloaded. The first condition can evaluate FE connectivity saturation based on the aggregate FE connectivity utilization across all FE ports T1 202a of the system A. In particular, the first condition can determine whether the FE connectivity utilization of the FE ports T1 202a of the system A 202 exceeds a maximum bandwidth threshold denoting the saturated or overloaded state of the FE ports T1 of the system A 202. If the foregoing first condition evaluates to true where the FE connectivity utilization of the FE ports T1 202a of the system A 202 exceeds the maximum bandwidth threshold, the FE connectivity of system A 202 is determined to be saturated or overloaded. In at least one embodiment, the maximum bandwidth threshold can be obtained from a specification such as provided by a manufacturer, distributor or seller of the system A 202. As another example, the maximum bandwidth threshold of the FE ports T1 202a can be determined based on testing and measurement such as performed by a data storage system customer. In at least one embodiment, the threshold and measured utilization values can be percentages where 100% can denote the maximum bandwidth capability of the FE connectivity of the system A 202. In this case, the threshold can generally be a suitable percentage less than 100%.

Also, the second condition of the criteria can be evaluated at the first point in time. The second condition can evaluate whether the system B has a measured level of FE connectivity utilization which is below a second predefined threshold, and additionally whether system B has a measured level of CPU utilization which is below a third predefined threshold. If the second condition evaluates to true, it indicates that the system B has a sufficient level of free or available resources which can be leveraged to receive and redirect requests to the system A. In connection with this particular example, the first and second conditions of the criteria can evaluate to true denoting saturation or overload of the FE connectivity of the FE ports (T1 202a) of the storage system A 202.

When the foregoing two conditions of the criteria are met or evaluate to true, the non-owning system B 222 can be used to redirect requests, which are directed to volume V1 204a and received at system B 222, to the owning system A 202. In such an embodiment, the federation can be initially configured at the first point in time consistent with discussion in connection with the table 310 of FIG. 4 such that volume V1 is presented as active over paths from one system or appliance (e.g., such as owning system A) and presented as inactive over paths from another system or appliance (e.g., such as non-owning system B). In this example, the two conditions of the criteria can be met where both conditions evaluate to true. Responsive to the two conditions of the criteria evaluating to true, processing can be performed to allow requests directed to V1 204a to be sent to both systems A 202 and B 222. In order to allow requests directed to V1 204a to be sent to both systems A 202 and B 222, the state of the systems A and B (and thus the paths to both systems A and B) can be presented to the hosts as active with respect to the volume V1. Generally in this example when both conditions of the criteria evaluate to true, processing can be performed to transition system B from an inactive state to an active state with respect to servicing requests directed to V1 204a as well as other volumes 204b-c owned by the system A. As a result of such processing, both systems A and B can be designated or configured as active with respect to receiving requests directed to the volumes V1, V2 and V3 (204a-c). In this manner with respect to volumes 204a-c, the paths to the non-owning system B can transition from inactive to active while the paths to the owning system A remain active. An I/O redirector component of system B can handle redirecting any requests, which are received at system B and directed to volume V1, V2 and/or V3 to the system A, over the inter-system link or connection 210, where system A can service the requests.

In at least one embodiment, a resource monitor can be used to monitor resource utilization across storage systems 202, 222 of the federation. In particular, for all storage systems of the federation, the resource monitor can monitor the CPU utilization of the storage systems and can monitor the FE connectivity utilization of all storage system FE ports.

What will now be described is further detail in connection with the foregoing example at a second point in time subsequent to the first point in time. At the second point in time, the processing has been completed to reconfigure the state of the system B 222, and paths from the system B 222, resulting in transitioning the system B 222 from inactive to active with respect to the LUNs or volumes V1, V2 and V3.

Referring again to FIG. 4, the table 320 shows the resulting path states at the second point in time after transitioning the system B 222 from inactive to active with respect to the LUNs or volumes V1, V2 and V3. Generally, at the second point in time, V1, V2 and V3 are configured and presented as active on both system A 202 and system B 222; and V4, V5, and V6 are configured and presented as active on system B 222 and inactive on system A 202. The element 330 denotes the path state changes or differences in the table 320 at the second point in time relative to the prior path states at the first point in time (as denoted in the table 310). In particular, the rows 322a-d of table 320 denote the same path states, respectively, as the rows 312a-d of table 310. The rows 322e-h now reflect the updated path state changes such that V1, V2 and V3 are also now active on both system A 202 and system B, where V1, V2 and V3 are now exposed, available and accessible for I/Os over paths from both system A 202 and system B 222.

Transitioning the state of system B 222 from inactive to active with respect to the LUNs or volumes V1, V2 and V3 can result in the hosts using the FE ports of both systems A and B whereby, for example, the hosts 232 and 234 can transition some of the I/O workload directed to V1 to the FE ports (T2 222a) of system B 222. As a result of transitioning the state of system B 222 from inactive to active with respect to the LUNs or volumes V1, V2 and V3, the LUNs or volumes V1, V2 and V3 are presented to the hosts 232, 234, 236 and 238 as available and accessible for I/Os over the additional FE ports T2 222a of system B 222. At the second point in time, assume that the actual I/O workload scenario as described in connection with FIG. 5 persists such that the hosts 232, 234 continue to send I/Os, which are directed to V1, to the system A 202 respectively over paths P1 242a and P3 242a; and that the hosts 236, 238 continue to send I/Os, which are directed to V4 and V5, to the system B 222 respectively over paths P6 242f and P8 242h. Additionally at the second point in time, the host 232 shifts some of its I/O workload directed to V1 to the system B 222 by sending I/Os directed to V1 over the path P2 242b; and the host 234 shifts some of its I/O workload directed to V1 to the system B 222 by sending I/Os directed to V1 over the path P4 242d.

Figure 6:
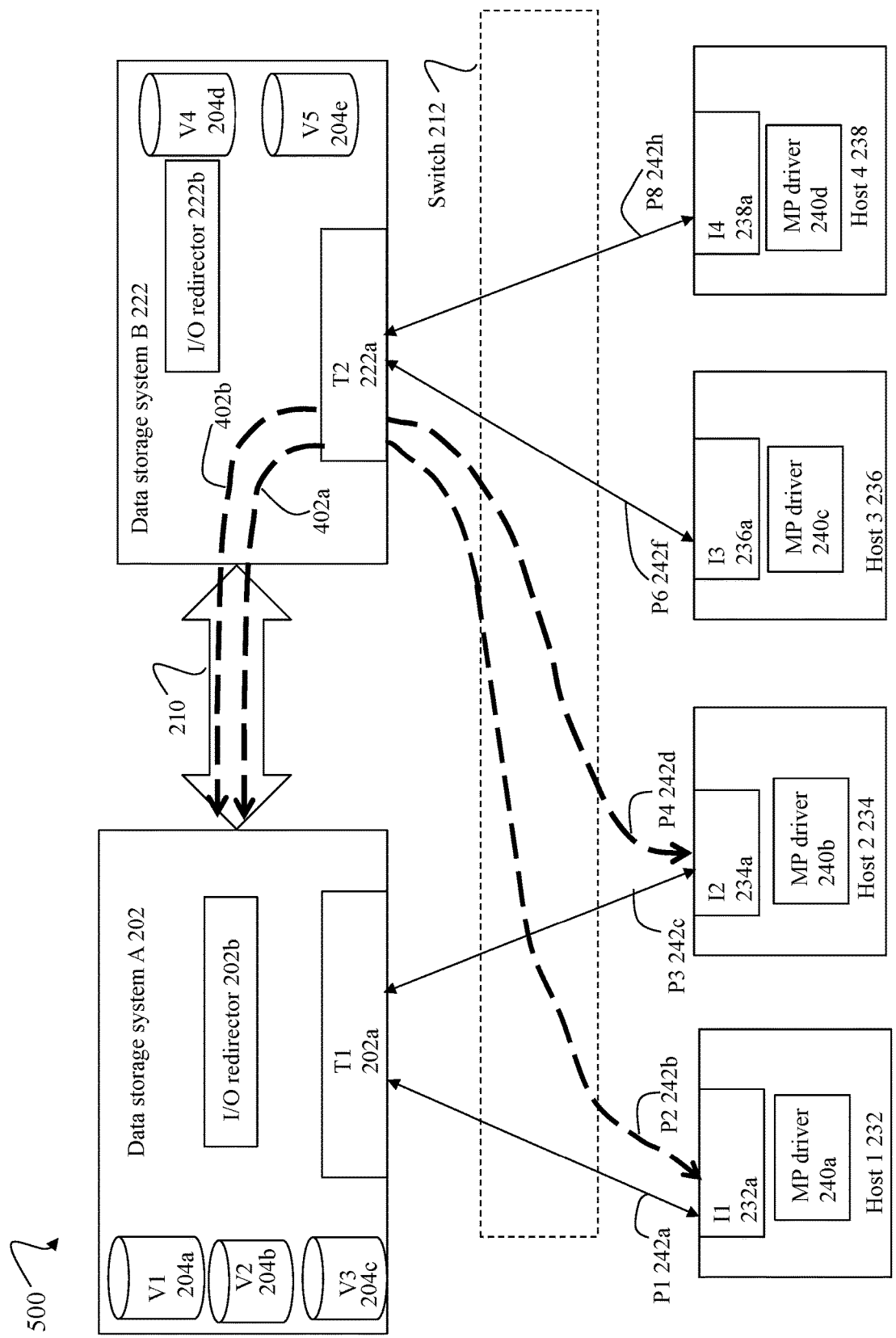

Referring to FIG. 6, shown is an example 500 illustrating the I/O workload scenario over used active paths at the second point in time after transitioning the state of system B 222 from inactive to active with respect to the LUNs or volumes V1, V2 and V3. In this workload scenario consistent with discussion above, the hosts 232, 234 are sending I/Os only to V1 and the hosts 236, 238 are sending I/Os only to V4 and V6. At the second point in time, the dashed bolded lines for the paths P2 242b and P4 242d denote that such paths 242b, 242d are now active and added at the second point in time. As a result, the paths P2 242b and P4 242d are now used by the hosts 232 and 234 (in addition to the paths P1 242a and P3 242c) for issuing I/Os directed to V1. The dashed bolded line 402a denotes the redirection of I/Os directed to V1 which are sent over path P2 242b to the system B, where such I/Os are received at an FE port T2 222a of the system B 222. The dashed bolded line 402b denotes the redirection of I/Os directed to V1 which are sent over path P4 242d to the system B, where such I/Os are received at an FE port T2 222a of the system B 222. The I/O redirector 222b can perform processing to handle such redirection of the I/Os directed to V1, where such I/Os are received at the system B 222 and then forwarded, over the inter-system link or connection 210, to the owning system A 202 for servicing.

In at least one embodiment, the I/O redirector 222b of the system B 222 is a component that identifies requests for volumes that are not owned by or assigned to the system B 222. In at least one embodiment, the I/O redirector 222b can maintain a list of local volumes or LUNs owned by the system B 222, and a list of redirected volumes or LUNs. The redirected volumes or LUNs can denote volumes or LUNs which are owned by another system or appliance in the federation. Thus, for each redirected volume, the redirected volume list of the I/O redirector 222b can also identify the corresponding system or appliance owner so that the I/O redirector 222b is able to determine the corresponding system or appliance owner to which to redirect or forward I/Os for the redirected volume, where such I/Os are received at the system B 222 and then redirected to the owning system or appliance. In this manner, the I/O redirector 222b can perform processing to properly route I/Os and other requests received at the system B 222 based on whether the particular LUN or volume (to which the I/Os are directed) is a local volume or a redirected volume. In at least one embodiment, the I/O redirector 222b can perform processing so that requests for volumes in the local volumes list are serviced locally on the system B 222, and so that requests for volumes in the redirected volumes list are sent to the corresponding owning system or appliance, such as the system A 202. In at least one embodiment, the return path associated with a redirected I/O can include the non-owning system, such as the system B 222, receiving a reply or response from the owning system, such as the system A 202, after the owning system has serviced or processed the redirected request forwarded by the non-owning system. Subsequently the non-owning system can then return the reply or respond to the host or other storage client that originated the redirected I/O. The generally, the I/O redirector can redirect requests of a volume or LUN to the owning system, where such requests are received by a non-owning system (which does not own the volume or LUN).

Other I/O redirectors, such as I/O redirector 202b, can perform processing similar to that as described above for the I/O redirector 222b with the difference that the owning system with respect to a volume or LUN is generally the system upon which the I/O redirector instance executes and performs processing. To further illustrate, in at least one embodiment, the I/O redirector 202b of the system A 202 is a component that identifies requests for volumes that are not owned by or assigned to the system A 202. In at least one embodiment, the I/O redirector 202b can maintain a list of local volumes or LUNs owned by the system A 202, and a list of redirected volumes or LUNs. The redirected volumes or LUNs can denote volumes or LUNs which are owned by another system or appliance in the federation. Thus, for each redirected volume, the redirected volume list of the I/O redirector 202b can also identify the corresponding system or appliance owner so that the I/O redirector 202b is able to determine the corresponding system or appliance owner to which to redirect or forward I/Os for the redirected volume, where such I/Os are received at the system A 202 and then redirected to the owning system or appliance. In this manner, the I/O redirector 202b can perform processing to properly route I/Os and other requests received at the system A 202 based on whether the particular LUN or volume (to which the I/Os are directed) is a local volume or a redirected volume. In at least one embodiment, the I/O redirector 202b can perform processing so that requests for volumes in the local volumes list are serviced locally on the system A 222, and so that requests for volumes in the redirected volumes list are sent to the corresponding owning system or appliance, such as the system B 222. In at least one embodiment, the return path associated with a redirected I/O can include the non-owning system, such as the system A 202, receiving a reply or response from the owning system, such as the system B 222, after the owning system has serviced or processed the redirected request forwarded by the non-owning system. Subsequently the non-owning system can then return the reply or respond to the host or other storage client that originated the redirected I/O.

With reference to FIG. 6, generally, the I/O response time for I/Os directed to V1 sent on the added paths P2 242b and P4 242d to the non-owning system B (which become active and require I/O redirection to the owning system A) can be greater than an I/O response time for I/Os directed to V1 sent on the paths P1 242a and P3 242c to the owning system A (which does not require such redirection). Consistent with discussion above, the paths to the non-owning system B can handle requests that arrive when the paths to the owning system A are saturated (e.g., as captured by the first condition of the criteria).

Additionally in at least one embodiment, the host can further perform processing to further enhance performance and utilization of data storage system resources. In at least one embodiment, the hosts can include and utilize an intelligent enhanced MP driver to implement MP policies discussed below to facilitate improved workload balance among the various active paths to FE ports of the data storage systems.

In at least one embodiment, the MP driver (240a-d) on each of the hosts can monitor a number of pending I/Os sent over the various multiple paths for the different LUNs or volumes. In particular, the MP driver of a host can track the number of pending or outstanding I/Os it sends to different FE ports of one or more data storage systems. In such an embodiment where an I/O is directed to a volume or LUN exposed over multiple paths and thus multiple FE ports of the storage system, the MP driver can send the next I/O to a selected one of the FE ports of the data storage systems which has a minimum number of pending or outstanding host I/Os of all such FE ports. In one aspect, the number of pending or outstanding host I/Os directed to each such FE port can denote a size or depth of the queue of pending I/Os of each such FE port. In this manner, the MP driver can send the next I/O to the particular FE port of the data storage systems having the minimum queue depth of outstanding I/Os from this particular host.

In at least one embodiment, FE ports of active data storage systems can be classified as a fast port or a slow port with respect to a volume or LUN. A fast port of a data storage system exposing a volume or LUN for I/O can be an FE port on an active data storage system which owns the exposed volume or LUN. In contrast, a slow port of a data storage system exposed a volume or LUN for I/O can be an FE port of an active data storage system which does not own the exposed volume or LUN. Thus, a slow port of a system can also be characterized as a redirected port in that I/Os directed to the volume or LUN received by the slow port of a non-owning system redirect the received I/O to the owning system for processing. In at least one embodiment, the queue depth of pending I/Os of the redirected or slow ports can be limited proportional to the available bandwidth of such slow ports.

In at least one embodiment, a data storage system can provide information to a host regarding which FE ports of the data storage system are slow or redirected ports and which are fast ports. In turn, the host, such as the MP driver of the host, can use this information in selecting a path and FE port over which to send I/Os.

In at least one embodiment, the MP driver can use the foregoing information regarding slow and fast ports to send write I/Os to a volume or LUN over paths to fast ports (of a data storage system which owns the volume or LUN) rather than slow or redirected ports (of a data storage system which does not own the volume or LUN).

In at least one embodiment, the MP driver can use the foregoing information regarding slow and fast ports to send small I/Os to a volume or LUN over paths to fast ports (of a data storage system which owns the volume or LUN) rather than slow or redirected ports (of a data storage system which does not own the volume or LUN). An I/O can be determined to be small based on the size of the I/O data payload being less than a maximum size. In this manner, redirection of small I/Os from a non-owning system to an owning system can be avoided since such small I/Os can be more sensitive to latency than other I/Os with larger payloads.

In at least one embodiment, the MP driver can use the foregoing information regarding slow and fast ports to send low bandwidth I/O operations or request to a volume or LUN over paths to fast ports (of a data storage system which owns the volume or LUN) rather than slow or redirected ports (of a data storage system which does not own the volume or LUN). Such low bandwidth operations can be predetermined or predefined based on expected bandwidth rates of such operations. In at least one embodiment, low bandwidth operations can include offload copy operations such as, for example, the XCOPY (Extended Copy) SCSI operation or command. Such offload copying commands like XCOPY can be used for data copying between SCSI targets in the same data storage system. The XCOPY command is a SCSI command included in the SCSI standard. Generally, the offload copy operation request can be issued by an external data storage system client, such as a host, as well as an internal data storage system client. In at least one embodiment, the offload copy operation or command, such as the XCOPY command noted above, is a request to perform an offload copy operation from a source to a destination or target. The source and the destination of the XCOPY or other offload copy operation can be specified in any suitable manner. For example, in at least one embodiment, the source can identify one or more logical devices or LUNs, and an associated LBA range of each of the one or more LUNs of the source; and the destination can also identify one or more logical devices or LUNs, and an associated LBA range of each of the one or more LUNs of the destination. The particular manner in which the LUNs are identified can vary with the particular protocol used to access the LUNs. For example, in at least one embodiment in accordance with the SCSI protocol, a LUN of the source or destination of the XCOPY command can be identified using the world wide name (WWN) used to uniquely identify the LUN at a protocol level identifier across the first and second systems, or more generally across multiple data storage systems. Such an offload copy command like XCOPY requests or instructs the data storage system to generally perform an offload copy command internal within the data storage system because both the source and destination of the copy command are within the same data storage system. Generally, the client, such as the host, requests using the XCOPY command that the data storage system manage the copying of the data from the source to the destination. The source and destination of the XCOPY command refer to storage objects, such as block-based addresses of logical devices, volumes, or LUNs, typically in the same system. For example, the source may be a location or logical address on a source device denoting a source LUN of the data storage system that received the XCOPY command. The destination or target of the XCOPY command may be a location or logical address on a target device that is also a logical device denoting the destination or target LUN of the data storage system that received the XCOPY command.

At a third point in time subsequent to the second point in time, a component, such as the resource monitor described elsewhere herein in at least one embodiment, can determine that both of the conditions of the criteria no longer evaluate to true. In particular, the resource monitor can determine that at least one of the two conditions of the criteria evaluate to false. Responsive to determining that the conditions of the criteria are no longer all met or no longer all evaluate to true, processing can be performed to configure and transition the system B 222 from active to inactive with respect to the volumes or LUNs V1, V2 and V3. Thus, the systems 202, 222 and associated 8 paths can transition from states corresponding to the table 320 of FIG. 4 to states corresponding to the table 310 of FIG. 4. In particular, the path states denoted by 330 of FIG. 4 return or transition to corresponding states denoted by column 310b of rows 312e-h of the table 310. As a result, the redirection of I/Os as described in connection with FIG. 6 ceases as the paths P2 242b and P4 242d transition to inactive. In at least one embodiment, an evaluation of the criteria can be performed periodically, and responsive to such evaluation, any suitable state transitions made with respect to volumes or LUNs, systems and corresponding paths.

Described below are flowcharts of FIGS. 7 and 8 which summarize processing described above which can be performed in at least one embodiment in accordance with the techniques of the present disclosure.

Figure 7:
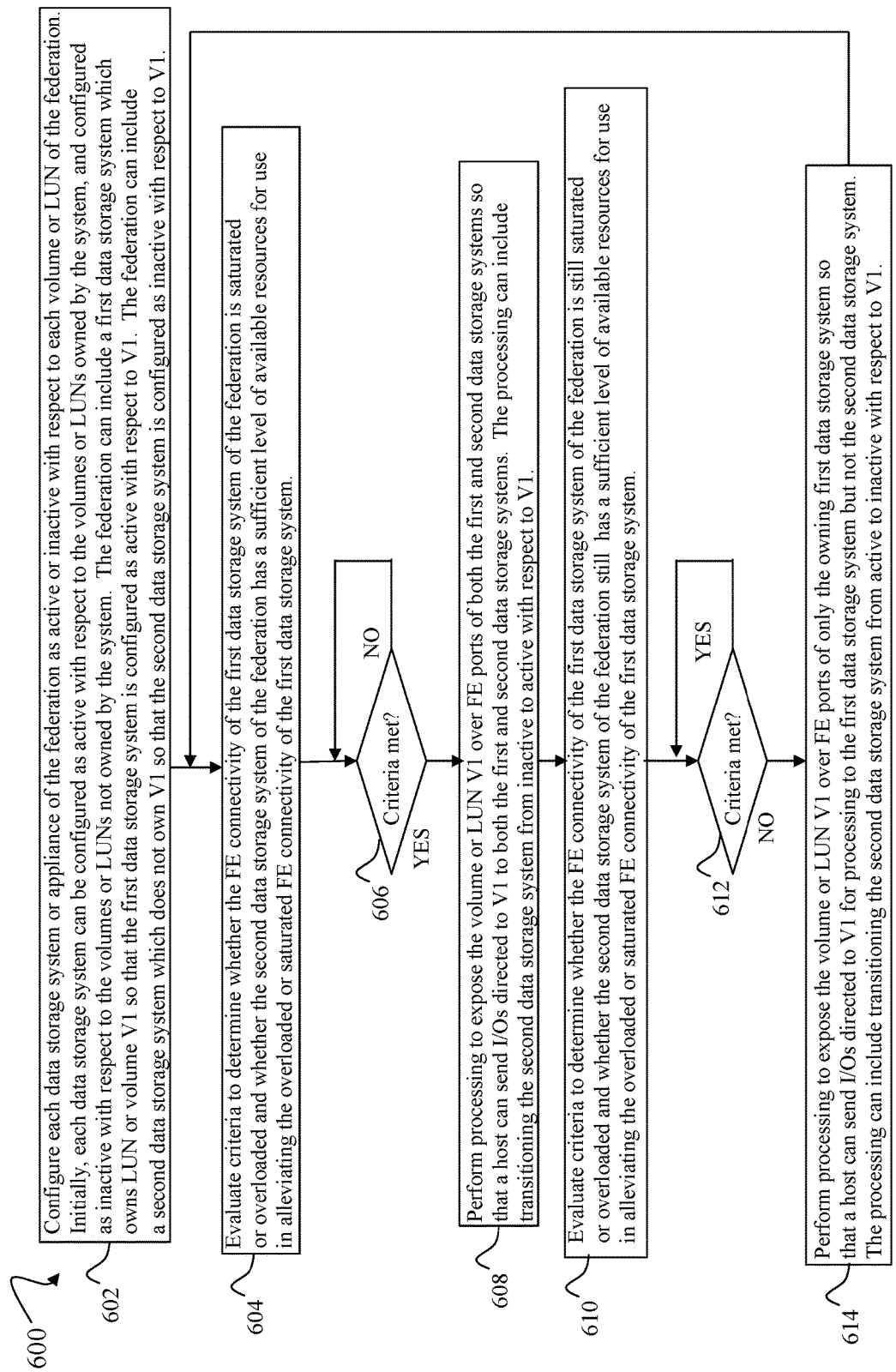
FIGS. 7 and 8 are flowcharts of processing steps which can be performed in at least one embodiment in accordance with the techniques of the present disclosure.

Referring to FIG. 7, shown is a first flowchart 600 of processing that can be performed in at least one embodiment in accordance with the techniques of the present disclosure.

At a step 602, processing can be performed to configure each data storage system or appliance of the federation as active or inactive with respect to each volume or LUN of the federation. Initially, each data storage system can be configured as active with respect to the volumes or LUNs owned by the system, and configured as inactive with respect to the volumes or LUNs not owned by the system. The federation can include a first data storage system which owns LUN or volume V1 so that the first data storage system is configured as active with respect to V1. The federation can include a second data storage system which does not own V1 so that the second data storage system is configured as inactive with respect to V1. From the step 602 control proceeds to a step 604.

At the step 604, processing can be performed to evaluate criteria to determine whether the FE connectivity of the first data storage system of the federation is saturated or overloaded, and whether the second data storage system of the federation has a sufficient level of available resources for use in alleviating the overloaded or saturated FE connectivity of the first data storage system. From the step 604, control proceeds to a step 606.

At the step 606, a determination is made as to whether the criteria is met and thus whether the foregoing conditions of the step 604 are both true. If the step 606 evaluates to no, control can remain at the step 606. If the step 606 evaluates to yes, control proceeds to the step 608.

At the step 608, processing can be performed to expose the volume or LUN V1 over FE ports of both the first and second data storage systems so that a host can send I/Os directed to V1 to both the first and second data storage systems. The processing can include transitioning the second data storage system from inactive to active with respect to V1. From the step 608, control proceeds to the step 610.

At the step 610, processing can be performed to evaluate or re-evaluate the criteria to determine whether the FE connectivity of the first data storage system of the federation is still saturated or overloaded and whether the second data storage system of the federation still has a sufficient level of available resources for use in alleviating the overloaded or saturated FE connectivity of the first data storage system. From the step 610, control proceeds to the step 612.

At the step 612, a determination is made as to whether the criteria evaluated in the step 610 is still met where both of the conditions of the step 610 are true. If the step 612 evaluates to yes, control remains in the step 612. If the step 612 evaluates to no, control proceeds to the step 614.

At the step 614, processing can be performed to expose the volume or LUN V1 over FE ports of only the owning first data storage system so that a host can send I/Os directed to V1 for processing to the first data storage system but not the second data storage system. The processing can include transitioning the second data storage system from active to inactive with respect to V1. From the step 614, control returns to the step 604.

Thus, the processing of FIG. 7 can be performed in an ongoing continual manner to periodically evaluate the criteria and make any needed state transitions.

Figure 8:
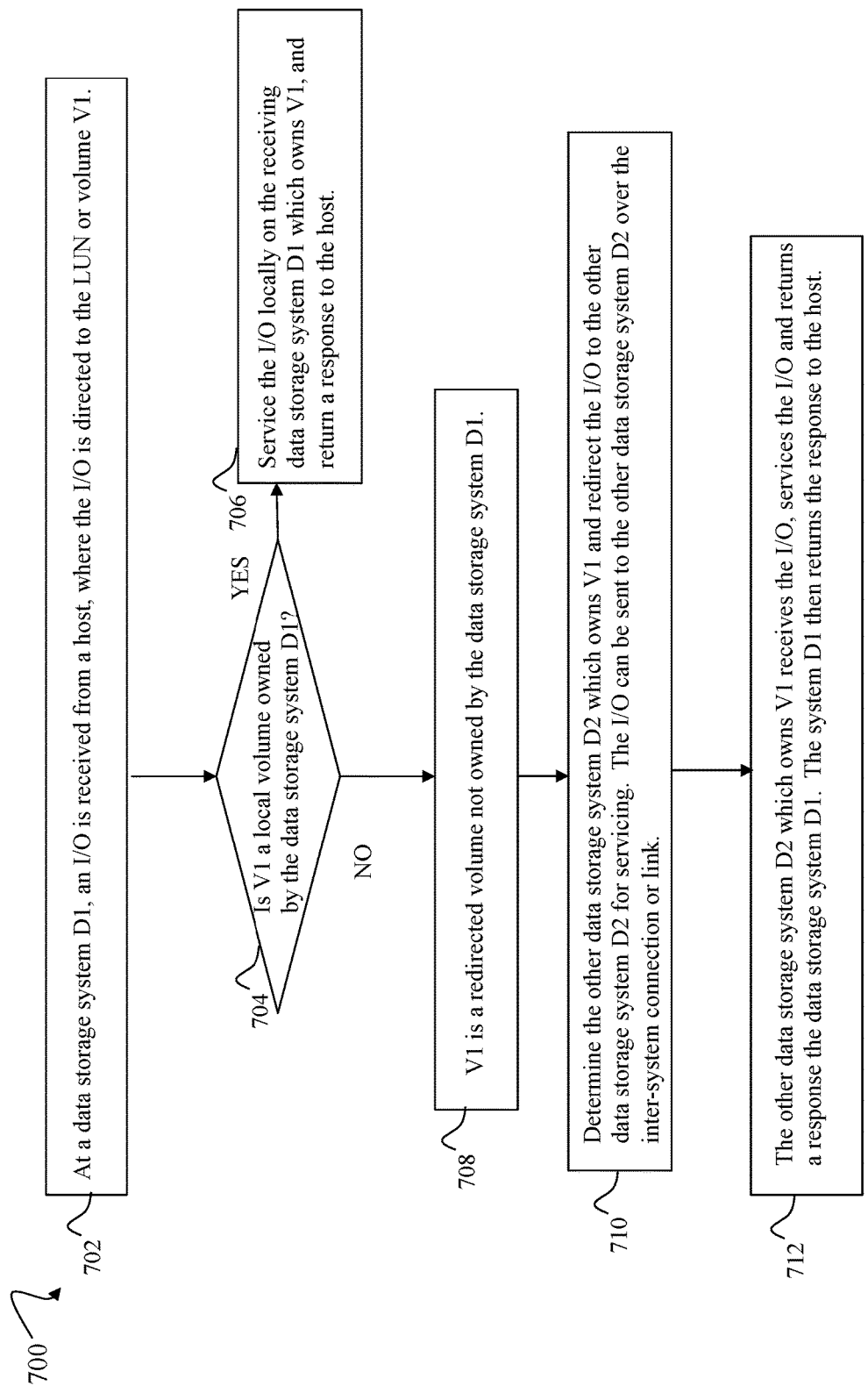

Referring to FIG. 8, shown is a second flowchart 700 of processing that can be performed in at least one embodiment in accordance with the techniques of the present disclosure.

At a step 702, at a data storage system D1, an I/O can be received from a host, where the I/O is directed to the LUN or volume V1. From the step 702, control proceeds to the step 704.

At the step 704, a determination can be made as to whether V1 is a local volume owned by the system D1. As discussed herein, the system D1 can maintain a local volume list and a redirected volume list. The step 704 can include determining whether V1 is located on the local volume list. If the step 704 evaluates to yes, control proceeds to the step 706. At the step 706, processing can be performed to service the received I/O locally on the system D1 which owns V1, and then return a response to the host. If the step 704 evaluates to no, control proceeds to the step 708.

At the step 708, since V1 is not a local volume owned by the system D1, it is determined that V1 is otherwise a redirected volume now owned by the system D1. In this case, V1 is included in the redirected volume list of the system D1. From the step 708, control proceeds to the step 710.

At the step 710, processing can be performed to determine that another data storage system D2 owns V1. In at least one embodiment, the owning system of a redirected volume can be obtained from the redirected volume list. The processing of the step 710 can include redirecting the I/O to the other owning system D2 for servicing. The I/O can be send to the system D2 over the inter-system connection or link between the systems D1 and D2. From the step 710, control proceeds to the step 712.

At the step 712, the other data storage system D2 which owns V1 receives the I/O, services the I/O and returns a response the data storage system D1. The system D1 then returns the response to the host.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
    configuring a federation to have a first volume as active from only a first storage system of the federation, wherein while the first volume is configured as active from only the first storage system of the federation, a host only sends I/O operations, which are directed to the first volume, to the first storage system of the federation, wherein said configuring the federation includes:
        configuring as inactive, with respect to the first volume, a second storage system of the federation;
    determining, subsequent to said configuring and in accordance with criteria, to allow I/O operations directed to the first volume to be sent to both the first storage system and the second storage system of the federation;
    responsive to said determining, transitioning the second storage system, with respect to the first volume, from inactive to active, wherein the first storage system is configured as active while the second storage system is also configured as active; and
    receiving, from the host at the first storage system and the second storage system, a plurality of I/O operations directed to the first volume while the first storage system and the second storage system are configured as active, wherein the plurality of I/O operations includes a first I/O operation received at the second storage system which is redirected, by the second storage system, to the first storage system for servicing.

2. The computer-implemented method of claim 1, wherein said configuring the federation includes:
    configuring as active, with respect to the first volume, the first storage system of the federation, wherein the host sends I/O operations directed to the first volume over a first set of one or more paths between the host and the first storage system while the first storage system is configured as active.

3. The computer-implemented method of claim 1, wherein the host does not send I/O operations directed to the first volume over a second set of one or more paths between the host and the second storage system while the second storage system is configured as inactive.

4. The computer-implemented method of claim 1, wherein the first volume is owned by the first storage system and physical storage mapped to the first volume is included on one or more non-volatile storage devices of the first storage system.

5. The computer-implemented method of claim 4, wherein, while the first storage system is owner of the first volume, the first storage system services all I/O operations which are received by the federation and directed to the first volume.

6. The computer-implemented method of claim 1, wherein the criteria include a plurality of conditions which all evaluate to true in said determining step and indicate to allow I/O operations directed to the first volume to be sent to both the first storage system and the second storage system of the federation.

7. The computer-implemented method of claim 6, wherein the criteria include a first condition which evaluates to true when front-end connectivity of front-end ports of the first storage system is saturated.

8. The computer-implemented method of claim 7, wherein the first condition evaluates whether a current front-end connectivity utilization of front-end ports of the first storage system is above a specified threshold.

9. The computer-implemented method of claim 8, wherein the specified threshold denotes an aggregate maximum bandwidth of front-end ports of the first storage system.

10. The computer-implemented method of claim 7, wherein the criteria include a second condition which evaluates to true when the second storage system has a sufficient level of available resources.

11. The computer-implemented method of claim 10, wherein the second condition evaluates whether the front-end connectivity utilization of front-end ports of the second storage system is below a specified threshold and whether CPU utilization of the second storage system is below a specified threshold.

12. The computer-implemented method of claim 10, further comprising:
    monitoring resource usage of storage systems of the federation;
    subsequent to said transitioning the second storage system, with respect to the first volume, from inactive to active, determining in accordance with said monitoring and the criteria to not allow I/O operations directed to the first volume to be sent to the second storage system of the federation;
    responsive to said determining to not allow I/O operations directed to the first volume to be sent to the second storage system of the federation, transitioning the second storage system, with respect to the first volume, from active to inactive;
    receiving, from the host at the second storage system while the second storage system is configured as inactive with respect to the first volume, a second I/O operations directed to the first volume; and
    responsive to receiving the second I/O operation while the second storage system is configured as inactive with respect to the first volume, not servicing the second I/O operation and returning a corresponding error state to the host.

13. The computer-implemented method of claim 12, wherein said determining in accordance with the criteria to not allow I/O operations directed to the first volume to be sent to the second storage system of the federation includes:
determining that at least one of the plurality of conditions of the criteria does not evaluate to true.

14. The computer-implemented method of claim 1, wherein said receiving the plurality of I/O operations directed to the first volume while the first storage system and the second storage system are configured as active further includes:
receiving, at the second storage system from the host, the first I/O operation directed to the first volume;
redirecting, by an I/O redirector of the second storage system, the first I/O operation from the second storage system to the first storage system;
servicing, by the first storage system, the first I/O operation directed to the first volume; and
returning a first response to the host for the first I/O operation, wherein the first response is returned along a return path from the first storage system to the second storage system, and then from the second storage system to the host.

15. The computer-implemented method of claim 14, wherein said receiving the plurality of I/O operations directed to the first volume while the first storage system and the second storage system are configured as active further includes:
receiving, at the first storage system, a second I/O operation directed to the first volume;
servicing, by the first storage system, the second I/O operation directed to the first volume; and
returning a second response to the host for the second I/O operation, wherein the second response is returned along a second return path from the first storage system to the host without including the second storage system.

16. A system comprising:
one or more processors; and
a memory comprising code stored thereon that, when executed, performs a method comprising:
configuring a federation to have a first volume as active from only a first storage system of the federation, wherein while the first volume is configured as active from only the first storage system of the federation, a host only sends I/O operations, which are directed to the first volume, to the first storage system of the federation, wherein said configuring the federation includes:
configuring as inactive, with respect to the first volume, a second storage system of the federation;
determining, subsequent to said configuring and in accordance with criteria, to allow I/O operations directed to the first volume to be sent to both the first storage system and the second storage system of the federation;
responsive to said determining, transitioning the second storage system, with respect to the first volume, from inactive to active, wherein the first storage system is configured as active while the second storage system is also configured as active; and
receiving, from the host at the first storage system and the second storage system, a plurality of I/O operations directed to the first volume while the first storage system and the second storage system are configured as active, wherein the plurality of I/O operations includes a first I/O operation received at the second storage system which is redirected, by the second storage system, to the first storage system for servicing.

17. A non-transitory computer readable medium comprising code stored thereon that, when executed, performs a method comprising:
configuring a federation to have a first volume as active from only a first storage system of the federation, wherein while the first volume is configured as active from only the first storage system of the federation, a host only sends I/O operations, which are directed to the first volume, to the first storage system of the federation, wherein said configuring the federation includes:
configuring as inactive, with respect to the first volume, a second storage system of the federation;
determining, subsequent to said configuring and in accordance with criteria, to allow I/O operations directed to the first volume to be sent to both the first storage system and the second storage system of the federation;
responsive to said determining, transitioning the second storage system, with respect to the first volume, from inactive to active, wherein the first storage system is configured as active while the second storage system is also configured as active; and
receiving, from the host at the first storage system and the second storage system, a plurality of I/O operations directed to the first volume while the first storage system and the second storage system are configured as active, wherein the plurality of I/O operations includes a first I/O operation received at the second storage system which is redirected, by the second storage system, to the first storage system for servicing.

18. The non-transitory computer readable medium of claim 17, wherein said configuring the federation includes:
configuring as active, with respect to the first volume, the first storage system of the federation, wherein the host sends I/O operations directed to the first volume over a first set of one or more paths between the host and the first storage system while the first storage system is configured as active.

19. The non-transitory computer readable medium of claim 17, wherein the host does not send I/O operations directed to the first volume over a second set of one or more paths between the host and the second storage system while the second storage system is configured as inactive.

20. The non-transitory computer readable medium of claim 17, wherein the first volume is owned by the first storage system and physical storage mapped to the first volume is included on one or more non-volatile storage devices of the first storage system, and wherein, while the first storage system is owner of the first volume, the first storage system services all I/O operations which are received by the federation and directed to the first volume.

* * * * *